United States Patent [19]
Onoue et al.

[11] 4,163,278
[45] Jul. 31, 1979

[54] VOLTAGE SUPPLY CIRCUIT RESPONSIVE TO PLURAL POSSIBLE DC INPUT LEVELS

[75] Inventors: Yoshinori Onoue, Mitaka; Katsuji Matsuura, Sagamihara; Shigenori Takahashi, Yokohama, all of Japan

[73] Assignee: Sony Corporation, Tokyo, Japan

[21] Appl. No.: 860,078

[22] Filed: Dec. 13, 1977

[30] Foreign Application Priority Data

Dec. 17, 1976 [JP] Japan .................. 51-152725

[51] Int. Cl.² ............................ H02M 3/335
[52] U.S. Cl. .............................. 363/101; 363/21; 363/97; 363/124
[58] Field of Search ................ 363/18–21, 363/60, 95, 97, 124, 131, 101

[56] References Cited

U.S. PATENT DOCUMENTS

| | | | |
|---|---|---|---|
| 2,890,403 | 6/1959 | Van Abbe | 363/18 |
| 3,381,202 | 4/1968 | Loucks et al. | 363/21 |
| 3,753,075 | 8/1973 | Tomura et al. | 363/131 |
| 3,815,007 | 6/1974 | Portmann | 363/18 |
| 3,842,589 | 10/1974 | Luce et al. | 323/17 X |

*Primary Examiner*—William M. Shoop

*Attorney, Agent, or Firm*—Lewis H. Eslinger; Alvin Sinderbrand

[57] ABSTRACT

A voltage supply circuit comprises an input for receiving a DC input voltage having one of plural possible levels; a DC-AC inverter for inverting the DC input voltage and which includes a boosting transformer having a winding with end terminals and an intermediate terminal and an inverter drive circuit for providing an AC current to the transformer; a connection between the input and the intermediate terminal of the boosting transformer for applying the DC input voltage to the latter; and a control circuit for controlling the inverter drive circuit, and which selects between a first condition, in which the inverter drive circuit is made operative so that a boosted voltage is provided at one end terminal of the boosting transformer, and a second condition, in which the inverter drive circuit is made inoperative, so that the DC input voltage introduced at the intermediate terminal is provided as a DC output voltage at the end terminal of the booster transformer. The control circuit can include a zener diode as a level detector to control a switching transistor so that the first and second conditions are selected on the basis of the level of the DC input voltage.

10 Claims, 6 Drawing Figures

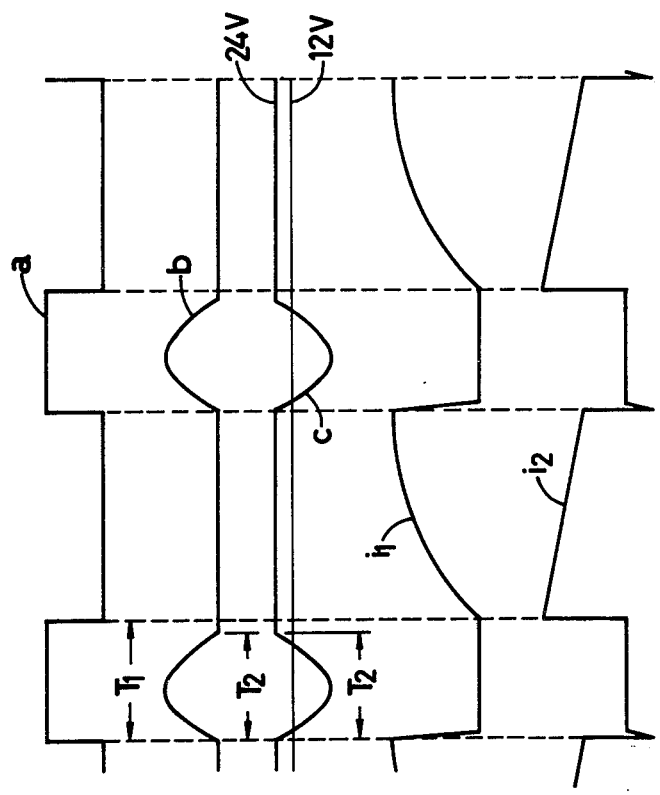

VOLTAGE SUPPLY CIRCUIT RESPONSIVE TO PLURAL POSSIBLE DC INPUT LEVELS

FIELD OF THE INVENTION

This invention relates to a voltage supply circuit, and more particularly to a voltage circuit suitable as a converter power circuit to convert one DC voltage to another DC voltage, or as an inverter power circuit to convert direct current to alternating current.

DESCRIPTION OF THE PRIOR ART

In the prior art, a switching regulator circuit has been proposed as a power circuit by which a constant DC output voltage is obtained from either of two quite different DC input voltages, such as 12 volts and 24 volts. In the prior art switching regulator circuit, a DC voltage is supplied through an input terminal to a switching circuit. An output voltage is obtained from an output terminal of the switching circuit, and the output voltage is compared with a reference voltage in a detecting circuit. The output of the detecting circuit is furnished, as an index of the comparison between the output voltage and the reference voltage, to a PWM (Pulse Width Modulation) circuit. The PWM circuit provides an output signal in which the pulse width depends on the comparison between the output voltage and the reference voltage, and such output signal is supplied to a switching circuit. The duty cycle (the relative percentage of time the switching circuit remains in an "ON" state) of the switching circuit is controlled with the output signal supplied from the PWM circuit. Thus, the output voltage is maintained at a predetermined level.

When a lower DC voltage is supplied through the input terminal to the switching circuit, the duty cycle is increased so that the switching circuit remains for a longer time in the "ON" state in order to obtain the output voltage at the predetermined level. Accordingly, higher currents flow through switching elements constituting the switching circuit. For this reason, special switching elements are required for the switching circuit. Furthermore because the above-described switching regulator circuit includes both detecting circuit and a PWM circuit, the circuit construction thereof becomes quite complex.

SUMMARY OF THE INVENTION

Accordingly, it is an object of this invention to provide a power circuit which can handle plural different input and/or output voltages in a circuit for comparatively simple construction.

Another object of this invention is to provide a power circuit which does not require special circuit parts.

In accordance with one aspect of this invention a voltage supply circuit includes an input for receiving a DC input voltage having one of plural possible levels; a DC-AC inverter for inverting the DC input voltage and which includes a boosting transformer with at least one winding which has end terminals and an intermediate terminal and an inverter drive circuit for providing an AC current to the transformer; a connection between the input and the intermediate terminal for applying the DC input voltage to the latter; and a control circuit for controlling the actuation of the inverter drive circuit. The control circuit selects between a first condition, in which the inverter drive circuit is made operative so that a boosted voltage is provided at one end terminal of the boosting transfomer, and a second condition, in which the inverter drive means is made inoperative, so that the DC input voltage is provided directly through the intermediate terminal to the end terminal of the boosting transformer.

Preferably, the control circuit includes a level detector, such as a zener diode, and a switching transistor controlled through the level detector, so that the first and second conditions are selected on the basis of the level of the DC input voltage detected by the level detector. A rectifier can be provided at one of the end terminals of the boosting transformer so that a DC output is provided therefrom, regardless of whether the first condition or the second condition is selected.

The above and other objects, features and advantages of this invention, will be apparent in the following detailed description of an illustrative embodiment which is to be read in connection with the accompanying drawings.

BRIEF DESCRIPTION OF THE DRAWINGS

FIGS. 2A to 2E are wave forms at the respective parts of the voltage supply circuit of FIG. 1, for explaining operations thereof.

DESCRIPTION OF THE PREFERRED EMBODIMENT

Figure 1:
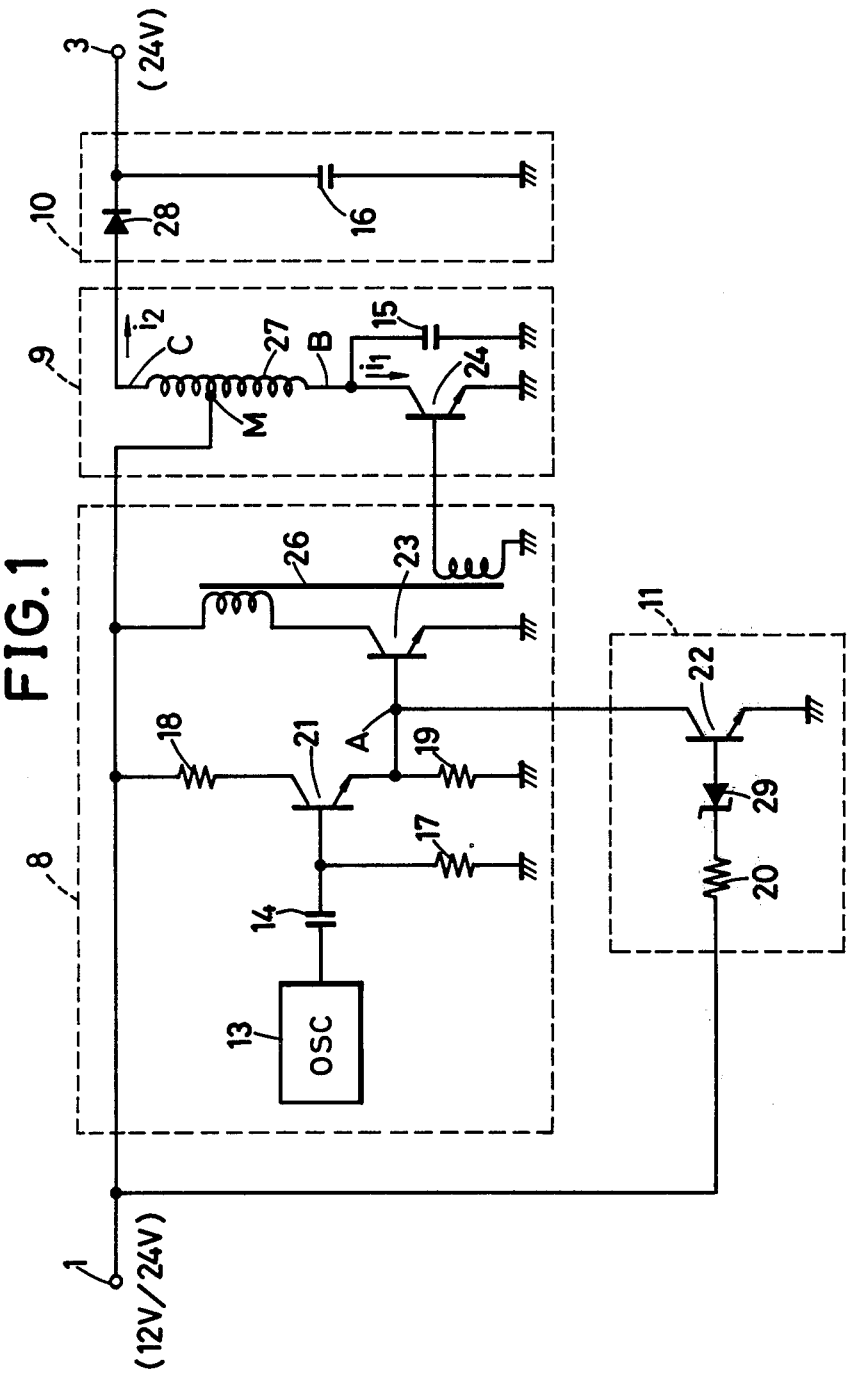
FIG. 1 is a block diagram of a power circuit according to one embodiment of this invention.

Referring to FIG. 1, DC voltage of either 12 volts or 24 volts is selectively applied to an input terminal 1 and is supplied therefrom through the input terminal 1 to a drive circuit 8 and a control circuit 11. The drive circuit 8 operates to drive an inverter circuit 9 to be described hereinafter, and it consists of an oscillator 13, transistors 21 and 23, a capacitor 14, resistors 17, 18 and 19 and a transformer 26. When the power circuit of FIG. 1 is used for a television receiver, the oscillator 13 does not need to be specially prepared, but a horizontal synchronizing signal generator or the like in the television receiver may be utilized as the oscillator 13.

The output of the oscillator 13 is supplied through a buffer amplifier which consists of the capacitor 14, the resistors 17, 18 and 19, and the transistor 21, to the transistor 23. The transistor 23 amplifies the output of the oscillator 13, and then the amplified output is supplied through the transformer 26 to the base of a transistor 24.

The DC input voltage applied to the control circuit 11 is also supplied through a resistor 20 and a Zener diode 29 to a base of a transistor 22. The resistor 20 operates to limit current flowing through the Zener diode 29 and to protect the latter. The emitter of the transistor 22 is connected to the ground, and a collector of the transistor 22 is connected to the base of the transistor 23 in the drive circuit 8.

The control circuit 11 operates to detect whether the DC voltage applied is 12 volts or 24 volts, and then controls the drive circuit 8 in response to such detection. The Zener voltage $V_z$ of the Zener diode 29 is such that $V_z$ satisfies the inequality, 12 volts $< V_z <$ 24 volts, for example, by selecting $V_z$ equal to 18 volts. Accordingly, when the input voltage is 12 volts, the transistor 22 is biased into the OFF state thereof, and the input voltage is 24 volts, the transistor 22 is biased into the ON state. Thus, the drive circuit 8 is automatically controlled in accordance with the level of input voltage. When it is not required to automatically control the drive circuit 8, the control circuit 11 may comprise a change-over switch which can be manually actuated.

The inverter circuit 9 is of the so-called "separately excited type", and it is driven with the drive circuit 8. The inverter circuit consists of the transistor 24, a capacitor 15 and a boosting, or step-up transformer 27 which is of the type of autotransformer having an intermediate terminal M. The DC input voltage is applied to the intermediate terminal M of the transformer 27. One terminal B of the transformer 27 is connected to a collector of the transistor 24. Another terminal C of the transformer 24 is connected to an anode of a diode 28 constituting a part of the rectifier circuit 10.

The rectifier circuit 10 consists of the diode 28 and a capacitor 16. The diode 28 operates to rectify the output of the boosting transformer 27. The capacitor 16 then smoothes the rectified output. The cathode of the diode 28 is connected to an output terminal 3, which provides the output of the overall circuit.

Additional elements may be included, according to well-known techniques, to stabilize the output level, if desired.

Next, operations of the voltage supply circuit of FIG. 1 will be described with reference to FIG. 1 and FIG. 2.

When the input voltage applied to the input terminal 1 is 12 volts, the transistor 22 is biased into the OFF state thereof. An output signal a shown in FIG. 2A is obtained at a point A in accordance with the output of the oscillator 13. The transistor 23 turns on and off in response to the levels of the signal a. The output of the transistor 23 is supplied through the transformer 26 to the base of the transistor 24 to make the transistor 24 turn on and off. The transistors 23 and 24 are coupled with each other through the transformer 26 in such a manner that the transistor 24 switches into the OFF state when the transistor 23 is in the ON state, and the transistor 24 switches into the ON state when the transistor 23 is in the OFF state. Periodic currents flow through the transformer 27 with the switching operations of the transistor 24.

When the transistor 24 is biased in the ON state, a current $i_1$ shown in FIG. 2D flows through the transformer 27, the current $i_1$ having a substantially triangular form which depends on the inductance of the transformer 27. During that time, the potential at the terminal B of the transformer 27 is substantially equal to the ground potential, as shown in FIG. 2B.

When the transistor 24 is switched into the OFF state, the potential at the terminal B rises due to the counter electromotive force in the transformer 27 to charge the capacitor 15, and then lowers with the decrease of the counter electromotive force to discharge the capacitor 15. Thus, a sinusoidal voltage b shown in FIG. 2B is obtained at the terminal B. The period $T_2$ of the sinusoidal voltage b is determined by the inductance of the boosting transformer 27 and the capacitance of the capacitor 15. The period $T_2$ is so selected as to be shorter than the pulse width $T_1$ of the output signal a of the oscillator 13 shown in FIG. 2A.

An output voltage c shown in FIG. 2C is obtained at the output terminal C of the boosting transformer 27. The waveform of the output voltage c is the inverse of the waveform of the voltage b at the terminal B of the transformer 27.

The turn ratio of the winding between terminals B and M to the winding between terminals M and C is so designed that the mean value of the AC output voltage c is 12 volts and the flat portion of the output c is at the level of about 24 volts as shown in FIG. 2C.

An output current $i_2$ shown in FIG. 2E flows into the rectifier circuit 10 with the voltage of the terminal C, where such current $i_2$ is smoothed. In practice, the flat portion of the output voltage c shown in FIG. 2C is so set as to be at the level slightly higher than 24 volts in consideration of the negative sinusoidal portion. Thus, the DC voltage of substantially 24 volts is obtained from the output terminal 3.

When the DC input voltage applied to the input terminal 1 is 24 volts, the transistor 22 is put in the ON state. Accordingly, the base of transistor 23 is shorted through the collector-emitter circuit of the transistor 22 to the ground. The transistor 23 is maintained in the OFF state regardless of the output of the oscillator 13. No periodic current flows through the transformer 26. Accordingly, the transistor 24 is also maintained in the OFF state, and no change of current occurs in the transformer 27. The DC input voltage supplied to the intermediate terminal M is supplied, without stepping-up through the winding between terminals M and C of the booster transformer 27 to the anode of the diode 28.

According to this embodiment as above described, when the input voltage is 12 volts, the inverter circuit is so operative as to boost the input voltage to 24 volts. When the input voltage is 24 volts, the inverter circuit is rendered inoperative and so the input voltage of 24 volts is led out without altering the level thereof. Thus, in the described embodiment one constant output voltage can be obtained from either of the two different input voltages.

While there has been described one preferred embodiment of the invention, it is apparent that further modifications and variations are possible in light of the above teachings. It is therefore to be understood that within the scope of the appended claims, the invention may be practised otherwise than as specifically described.

For example, in the above-described embodiment, one constant output voltage can be obtained from either of the two different input voltages. However, moreover according to this invention, a selected one of two different output voltages can be obtained from a single input voltage. In this case, a DC voltage of 12 volts is supplied to the input terminal, and the output voltage of either 24 volts or 12 volts is obtained by controlling the operation of the inverter circuit in the voltage supply circuit of FIG. 1.

In the above embodiment, the drive circuit is arranged for the separate-excitation type inverter circuit. However, the inverter circuit may be of the self-excitation type. In such case, the oscillating operation of the inverter circuit is so controlled from the control circuit that the inverter circuit is thereby rendered operative or inoperative. The drive circuit can be omitted.

What is claimed is:

1. A voltage supply circuit comprising:
   input means for receiving a DC input voltage having one of plural possible levels;
   DC-AC inverter means for inverting said DC input voltage including a boosting transformer having at least one winding with end terminals and an intermediate terminal, and inverter drive means for providing a pulsed current to said transformer;
   means connecting said input means to said intermediate terminal for applying said DC voltage to said transformer at said intermediate terminal; and control circuit means for controlling said inverter drive means and which alterlatively selects between a first condition in which said inverter drive means is made operative and a boosted voltage is provided at one end terminal of said boosting transformer, and a second condition in which said inverter drive means is made inoperative so that said DC input voltage is provided at said end terminal, said control circuit means including level-detecting means for detecting the level of said DC input voltage and switching means selecting between said first and second conditions on the basis of the level of said DC input voltage detected by said level detecting means.

2. A voltage supply circuit according to claim 1; in which said level-detecting means includes a zener diode to actuate said switching means in dependence on the relation between said DC input voltage and the zener voltage of said zener diode.

3. A voltage supply circuit according to claim 1; further comprising rectifier means coupled with one of said end terminals of the winding of said boosting transformer to provide a DC output regardless of whether said first condition or said second condition is selected.

4. A voltage supply circuit according to claim 3; in which said rectifier means includes a diode having one side connected to said one end terminal and a smoothing capacitor connected with the other side of said diode.

5. A voltage supply circuit comprising:
input means for receiving a DC input voltage having one of plural possible levels;
DC-AC inverter means for inverting said DC input voltage including a boosting transformer having at least one winding with end terminals and an intermediate terminal, and inverter drive means for providing a pulsed current to said transformer, said inverter drive means including oscillator means providing an AC switching signal and switching means controlling the current to said boosting transformer in response to said AC switching signal when said control circuit selects said first condition;
means connecting said input means to said intermediate terminal for applying said DC voltage to said transformer at said intermediate terminal; and
control circuit means for controlling said inverter drive means and which alternatively selects between a first condition in which said inverter drive means is made operative and a boosted voltage is provided at one end terminal of said boosting transformer, and a second condition in which said inverter drive means is made inoperative so that said DC input voltage is provided at said end terminal.

6. A voltage supply circuit according to claim 5; in which said inverter drive means further includes another switching means coupled with said oscillator means and said control circuit means to switch between an ON and an OFF state in response to said AC switching signal when said control circuit means selects said first condition, and which is rendered unable to switch between said ON and OFF states when said control circuit means selects said second condition, said other switching means has an output to control the first mentioned switching means so that said first switching means provides an alternating current to said boosting transformer when said first condition is selected, but is rendered unable to supply said alternating current when said second condition is selected.

7. A voltage supply circuit according to claim 6 in which said control circuit means includes level-detecting means for detecting the level of said DC input voltage and a switching element selecting between said first and second conditions on the basis of the level of said DC input voltage detected by said level-detecting means and supplying a control signal to said other switching means so that the latter is enabled to switch between said ON and OFF state when said first condition is selected and is rendered unable to switch between states when said second condition is selected.

8. A voltage supply circuit according to claim 7; further comprising a second transformer, wherein said other switching means is coupled to control said first switching means through said second transformer.

9. A voltage supply circuit according to claim 7; in which said boosting transformer and said first switching means are connected together in series, and said inverter drive means further includes a capacitor connected in parallel with said first switching means.

10. A voltage supply circuit comprising
input means for receiving a DC input voltage having one of plural possible levels;
DC-AC inverter means for inverting said DC input voltage including a boosting transformer having at least one winding with end terminals and an intermediate terminal, and inverter drive means for providing a pulsed current to said transformer;
means connecting said input means to said intermediate terminal for applying said DC voltage to said transformer at said intermediate terminal; and
control circuit means for controlling said inverter drive means and which alternatively selects between a first condition in which said inverter drive means is made operative and a boosted voltage is provided at one end terminal of said boosting transformer, and a second condition in which said inverter drive means is made inoperative so that said DC input voltage is provided at said end terminal; and in which said inverter drive means includes switching means and a capacitor, said switching means being connected in series with said boosting transformer and said capacitor being connected in parallel with said switching means, said switching means being enabled to switch between ON and OFF states when said control circuit means selects said first condition.

* * * * *